United States Patent [19]

Vogelsang

[11] Patent Number: 4,796,247

[45] Date of Patent: Jan. 3, 1989

[54] COMPACT DISC (CD) PLAYER AND METHOD OF COMPENSATING FOR TRACKING JUMPS

[75] Inventor: Ulrich Vogelsang, Hildesheim, Fed. Rep. of Germany

[73] Assignee: Blaupunkt Werke GmbH, Hildesheim, Fed. Rep. of Germany

[21] Appl. No.: 54,688

[22] Filed: May 27, 1987

[30] Foreign Application Priority Data

Jun. 7, 1986 [DE] Fed. Rep. of Germany ....... 3619258

[51] Int. Cl.$^4$ .............................................. G11B 7/00
[52] U.S. Cl. .................................. 369/44; 360/78.11; 369/33; 358/907
[58] Field of Search .................. 360/78; 358/342, 907; 369/32, 33, 43–47

[56] References Cited

U.S. PATENT DOCUMENTS 4,698,796 10/1987 Kimura ................................ 369/44

*Primary Examiner*—Robert L. Richardson
*Attorney, Agent, or Firm*—Frishauf, Holtz, Goodman & Woodward

[57] ABSTRACT

To provide for continuity of audio output from a compact disc (CD) player, installed in an environment subject to shock or vibration, for example in a motor vehicle, the CD player includes an extra write-read memory (31), placed in the signal processing path of a signal scanned by an optical scanning system to a digital-/analog converter in advance of an audio output system (AR), a repositioning system (36) to reposition the optical scanning optical system on a track which may have been lost due to a jolt or vibration, and a synchronizing system to synchronize writing in the write-read memory after repositioning of the optical scanning system at the end of previously written data in said write-read memory immediately in advance of tracking loss. Tracking loss can be sensed by determining loss of information data, or sensing of a scanning beam from the optical scanning system impinging on the mirror surface of the CD, with the number of tracks being jumped being determined by comparing timing data included in the CD scanned data with previously recorded data to thereby determine the length of track, and hence the number of track spirals which were skipped or jumped. Preferably, scanning and writing after detection of a tracking jump and repositioning is accelerated to rapidly refill the write-read memory, for example by increasing an operating clock rate while maintaining constant the read-out rate from the write-read memory (31).

22 Claims, 3 Drawing Sheets

COMPACT DISC (CD) PLAYER AND METHOD OF COMPENSATING FOR TRACKING JUMPS

The present invention relates to a compact disc player, for short CD player, and more particularly to a CD player which can be installed in locations subject to vibration and shock, for example within an automobile; and to a method for compensating for tracking jumps in case, due to vibration and shock, the tracking system of the CD player jumps away from a track to be reproduced.

BACKGROUND

Standard compact discs have a diameter of about 12 cm; they contain audio information and auxiliary information, for example relating to the number of the music titles to be found on one CD, identifying the composer, the artists, reproduction duration, and the like; additionally, data relating to synchronization and error correction for proper operation of the CD player may be stored. The data typically are stored digitally in pulse code modulation technology. The 1/0 pulses of a pulse code modulation (PCM) signal is formed in the plate as a microscopically small depression or pit. The pits are arranged in a spiral, impressed on the CD, extending from an inward point outwardly toward the circumference. The tracks, radially, have a tracking distance or spacing of about 1.6 micrometers. A large number of such tracks, measured in radial direction, are located adjacent each other. The digital data are defined by the pit length and the spacing between pits, so that the data used in the CD can provide the eight-to-fourteen modulation (EFM).

The spiral has approximately 13,000 information tracks measured in radial direction. The spiral is impressed in a mirrored metallic surface formed as an information plane of the CD. On the impression side, a protective letter coating is applied thereover on which the label of the CD is attached. At the other side, the information plane is covered with a transparent cover layer of precisely predetermined index of refraction. The information on the CD is scanned through this transparent cover layer by a laser beam. Scanning is carried out with a constant bit rate. The speed of the plate drive motor is changed as the scanning radius changes, from about 500 rpm when an inner spiral is tracked, to about 200 rpm towards the edge of the CD. The scanned information is derived as digital data which is first recorded in a 16 kBit random access memory (RAM) of the signal processing device, to be read out therefrom at a clock frequency which is precisely quartz controlled. Speed changes of the CD drive motor thus will not have an influence on synchronization of reproduced output with respect to recorded input.

The CD is scanned in the CD player by a laser diode having a light output power of about 1 mW, and a wave length which is in the infrared region. The laser beam is focussed by a movable optical scanning system, movable in two directions—axially and radially with respect to the CD—to scan the tracks in the information plane of the CD. A focus servo loop circuit for precise focusing is provided, as well as a tracking and a track control circuit for precise tracking of the scanning optic on the signal track being scanned. The scanning optics is controlled by a course control, by securing the scanning optic to a slider which is radially movable with respect to the rotating plate by a motor drive. A slider or carriage control loop is provided to control the respective radial shift of the slider or carriage so that the scanning optic can pass or scan radially across the entire radius of the CD. In addition, a fine control is provided. At any position of the slider, the track control circuit of the scanning optic can control the scanning optic over a fine tracking range of about 40 adjacent tracks at any position of the slider or carriage.

The scanning values or signals derived from the scanning optic are amplified and converted into an analog output signal to be applied to a signal processing device. The analog output signals are then transformed into a digital signal synchronized with the clock frequency of the signal processing apparatus. Thereafter, the EFM demodulation and a subcode demodulation are carried out. The subcode demodulation results in a subcode Q-signal which includes a plurality of specified bits, namely

--- synchronizing bits
control bits
monitoring bits
72 data   Q bits having 9 Q-data:
    TNO:    -    number of the music piece
    X:    characteristic of the chopping rate
    MIN
    SEC
    FRAME    data regarding playing time and
    ZERO    title in binary coded decimal
    AMIN    (BCD) code
    ASEC
    AFRAME

---

As the playing time of the CD increases, the time indication also increases. In the pauses between music titles, the time indication is reset back to zero. The data derived from EFM are recorded in the RAM. The recorded data are decoded by CIRC decoding, and the decoded data are then read out and applied via an error correction circuit and a digital filter to a digital-analog (D/A) converter. The analog output signal is separated over a quieting or muting circuit, and applied to respective left and right (L and R) stereo channels of an audio component of a receiver or audio amplifier.

Operation of CD players in automotive vehicles unavoidably results in tracking jumps due to mechanical shocks and vibrations to which the CD player will be subjected. The scanning optic, for example, upon being subjected to a shock, may lose the then scanned track and, after the shock has dissipated, may be positioned, at random, opposite another track. To reduce shocks and resistance to vibration to the CD player, it has been proposed to suspend the mechanical portion of the CD player, including the drive motor and the scanning optic, with the slide, in a vibration and shock damped suspension. This substantially increases the volume of the CD player; complete isolation from shock and vibration due to road conditions, for example, cannot be avoided; further, the limited space within the dashboard area of a vehicle usually prevents elaborate shock and vibration resistant suspension systems.

THE INVENTION

It is an object to so improve a CD player that tracking jumps can be electronically compensated.

Briefly, a right-read memory is included in the signal processing path of the signal from the compact disc to the audio output circuit, for intermediate storage of data blocks. The data blocks are continuously read out and applied to the audio output stage. Additionally, a repositioning arrangement is provided, coupled to receive the tracking signal and detecting a tracking jump, the respositioning arrangement being coupled to the optical scanning system for repositioning the scanning optical system after detection of a tracking jump. A synchronizing arrangement synchronizes writing into the write-read memory after repositioning of the scanning optical system with the end of the previously written block, that is, the block which was recorded prior to the tracking jump.

The CD player can, thus, compensate for tracking jumps of up to 40 tracks. Shocks and vibrations which might trigger greater tracking jumps hardly ever occur in ordinary vehicular operation and can be avoided by small mechanical damping structures, and/or disconnection of the slider motor, to such a level that, at the most, only 40 tracks will be jumped upon occurrence of a shock. The intermediate storage of the data in the additional write-read memory which may be an RAM or a FIFO (first in, first out) memory permits, even during a tracking jump, continued supply of data previously scanned on the CD, and without influence of the tracking jump, for application to the audio portion of the system, typically a car radio with its associated loudspeakers. The scanning optic is returned to the lost track while the additional memory is read out with constant reading frequency. The recording or writing of data, which is interrupted upon sensing of a tracking jump, that is, loss of the appropriate scanned track, is continued by writing in the additional memory by means of the synchronization arrangement at the appropriate place, joining the previously recorded data.

DRAWINGS

DETAILED DESCRIPTION

Figure 1:
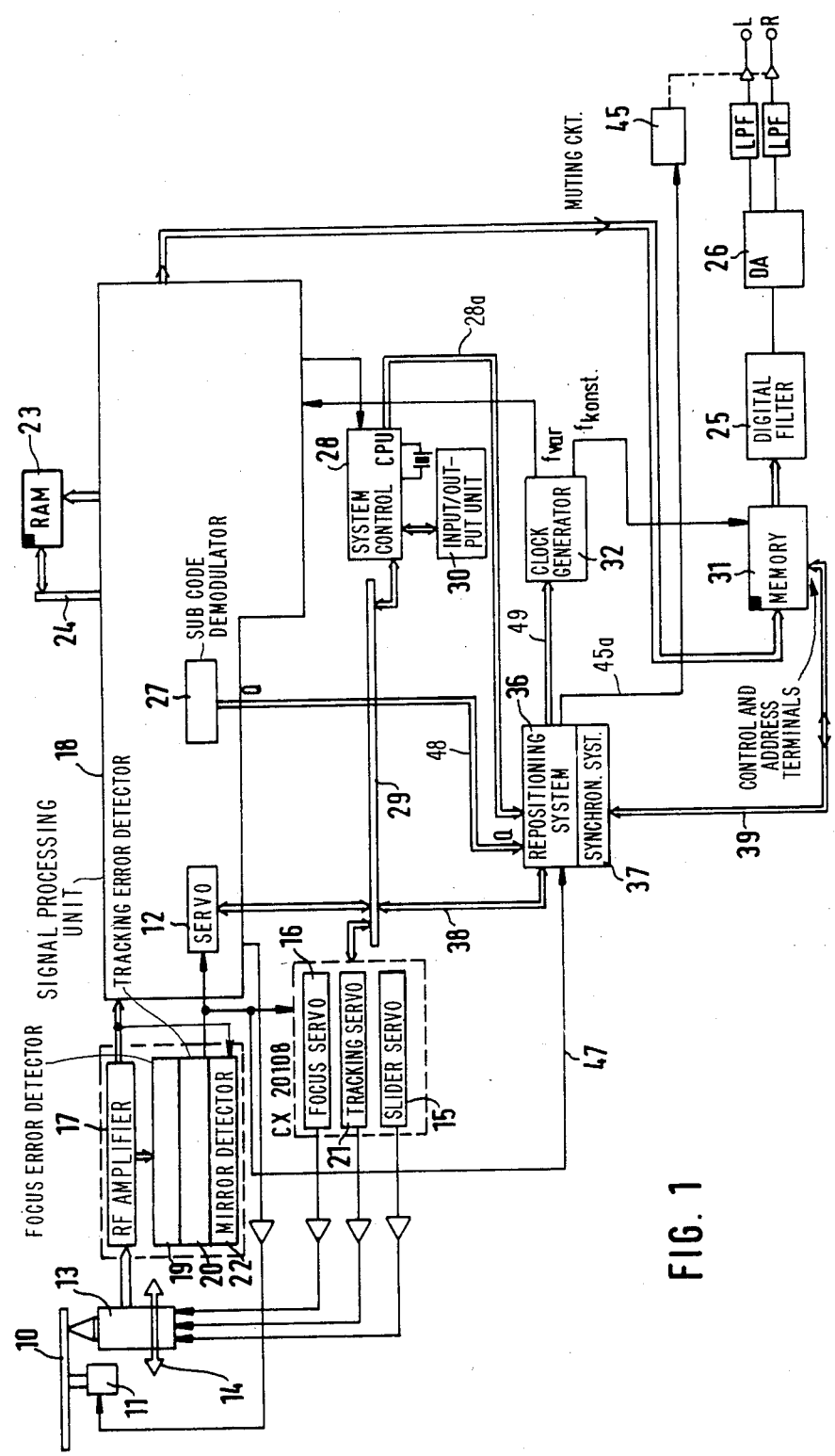
FIG. 1 is a schematic block diagram of a CD player, illustrating the standard components of a CD player and, additionally, incorporating the present invention.

FIG. 1 illustrates the general structure of a CD player, as well known, and the additional feature in accordance with the present invention. For an understanding of the present invention, it is necessary to describe the well known CD player, however.

A compact disc 10 is placed on a turntable, driven by a motor 11. The motor is so controlled by a disc motor servo 12 that the linear speed of the spiral information tracks on the CD 10, in the form of pits carrying the information, will be essentially constant with respect to a scanning optic 13. The spiral information tracks, however, require a change in operating speed of the motor 11 from between 500 rpm at the inner side of the disc to about 200 rpm at the edge of the disc.

The scanning optic includes an optical pick-up 13 which is seated on a slider or carriage 14, radially movable, and shown in FIG. 1 only symbolically by the double arrow. The structure and system is well known. The slider 14 is controlled by a slider servo 15 which controls a motor to move the slider radially, and thus provides for course tracking of the scanning optic 13 in radial direction with respect to the rotating CD 10. The scanning optic 13 includes a semiconductor laser diode, of about 1 mW light output power, and operating in the infrared region. The beam emitted by the laser passes through a beam deflection or bending element which generates secondary beams used for tracking. A polarization prism provides for linear polarization of the laser light so that, after passing through a collimated lens to be circularly polarized by a λ/4 plate upon simultaneous rotation of the polarization plane about 45°. The λ/4 plate is followed, in the beam direction, by a two-axis element which is shiftable in radial correction as well as axial direction with respect to the CD 10. The two-axis element is used for two purposes: (1) for focussing of the laser beam on the information tracks. A focussing servo loop, including a focus servo 16, is appropriately controlled to provide for focussing. (2) The two-axis element is additionally used for tracking of the laser beam and is controlled in that direction by a tracking servo 21 in such a manner that the laser beam can be shifted radially with respect to the rotating CD 10.

The laser beams reflected from the CD 10, upon the return path, again return to the two-axis element and then, at a second time, impinge on the λ/4 plate. The still circularly polarized light is again linearly polarized and the polarization plane again shifted by 45°. Thereafter, the light passes through the collimating lens arrangement and linearly polarized, but rotated by 90°, impinges on the polarization prism. The laser light is totally reflected and is deflected on a detection plane, which includes four separate detection fields. The output voltages derived from the four detection fields are proportional to the area scanned by the beam. Addition of the four voltages derived from the four detection fields then provides a signal having, as signal content, the analog output voltage, in radio frequency form, which is applied over a radio frequency amplifier 17 to a signal processing unit 18.

A focus error detector 19 is provided, adding the output voltages of diametrically opposite detection fields. The sums of the diametrically opposite output detection fields are subtracted from each other. Upon incorrect focussing of the two-axis element, an error voltage will result which is applied to the focus servo 16.

The four detector fields detect the main light beam. In addition, the detector surface of the scanning optic 13 has two further auxiliary light detection fields for the auxiliary or secondary beams. These auxiliary light detection fields are used for tracking of the scanning optic 13 on the information tracks. Upon optimum tracking, the next subsequent bit in advance and behind the scanned bit is scanned at the right edge and the left edge, respectively, by the respective auxiliary beam. The reflected auxiliary beams at the auxiliary light detection fields should, upon central tracking, provide the same output voltages. If there is a tracking error, different output voltages result. The tracking error detector 20 provides, by means of a differential amplifier, for evaluation of the output voltages of the secondary detector fields, and generates a compensating or correcting voltage, having a polarity proportional to the direction and a level representative of the extent of tracking deviation. This tracking correction voltage is applied to the tracking servo 21 and to the slider servo 15. Corresponding control voltages are then generated by the tracking servo for the two-axis element and by the slider servo for the slider or carriage 14 of the optical system 13.

A mirror detector 22 is provided in order to prevent the tracking servo 21 from locking the main beam on the mirror positioned between the information tracks. The mirror detector 22 is connected through the RF amplifier 17 with the output of the scanning optic 13. The mirror detector 22 evaluates the RF voltage at the output of the scanning optic, as amplified in the amplifier 17, and provides a mirror signal in form of a recognition pulse, which rovides information if the main beam of the laser is on an information track or between the information tracks on the mirror. If the main beam should be on the information track, a maximum of rectified RA voltage will occur; if the main beam should, however, be positioned on the mirror, the voltages will be a minimum; the respective minimum voltage is detected in the mirror detector 22.

The foregoing components and arrangements are well known; the scanning optic 13 can use the component FOP/LDX-105, commercially provided by the Sony Corporation. The operation of the RF amplifier 17, focus detector 19, tracking error detector 20 and mirror detector 22 is all contained within an integrating circuit (IC) of the type CX 20109 by Sony. The focussing servo 16, tracking servo 21, and slider servo 15 are available commercially as the IC CX 20108 by Sony.

The signal processing unit 18, together with the motor servo 12, is available as the IC CX 23035 by SONY. It is associated with an external 16-kBit space RAM 23, connected thereto by a data bus 24. The signal processing unit 18 receives the output signal from the scanning optic 13, amplified in the RF amplifier 17. The signal processing unit 18, initially at the input, converts the analog signal into digital data which are processed in blocks, with intermediate storage RAM 23. One obtains, then, digital audio signals which, after filtering in digital filter 25, are converted in a D/A converter 26 into analog output signals for application through respective low-pass filters (LPFs) to output terminals L and R, to energize respective left and right stereo channels of the audio section of a car radio, receiver, or the like. A subcode block is used in the signal processing, for example for control purposes, which is demodulated by a subcode demodulator 27 to obtain a subcode-Q-signal with 98 bits. Besides the control bits and monitoring bits, as well as the synchronizing bits, 72 data-Q-bits with 9-Q-data TNO, X, MIN, SEC, FRAME, ZERO, AMIN, ASEC AFRAME are contained. The function of these Q-data is known and has been described above.

The entire signal processing unit 18, including the focus servo 16, tracking servo 21 and slider servo 15 are controlled by a system control central processing unit (CPU) 28 over a control bus 29. The system control CPU 28 communicates with an input-outpet unit 30 which includes a display and an operating control panel. The system control CPU includes a quartz controlled oscillator, as schematically indicated in FIG. 1. So far, the system is standard in the industry.

In accordance with the present invention, a write-read or record-read memory 31 is included in the path of the signal. The memory 31 can be included at any desired position in the data processing path after the initial A/D conversion and before the final D/A conversion in D/A converter 26. Preferably, and as shown, the memory 31 is located between the signal processing unit 18 and the digital filters 25. The memory 13 can be a random access memory (RAM) or a first-in first-out register (FIFO memory), or may be a combination of both these elements. The memory 31 is operated at a constant read-out frequency which is provided by a clock generator 32.

Figure 3:
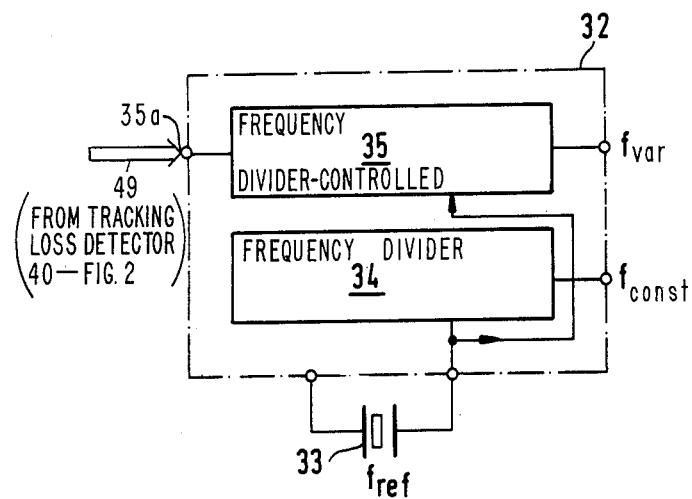
FIG. 3 is a detailed diagram of a block generator for use in the system of the present invention, and as generally shown in FIG. 1.

The details of the clock generator 32 are shown in FIG. 3, to which reference will be made. The clock generator 32 includes a quartz oscillator 33 which provides a reference frequency $f_{ref}$. The reference frequency is divided by a first frequency divider 34 to provide a constant read-out frequency $f_{const}$. Further, the frequency from quartz oscillator 33 is divided in a second frequency divider 35 which can be controlled to provide at least two different output frequencies $f_{var}$, that is, of variable frequency in accordance with an input signal applied to terminal 35a of the frequency divider 35. The changeable or variable frequency $f_{var}$ is applied to the signal processing unit 18 and forms the clock frequency for the signal processing unit 18, as seen in FIG. 1.

In accordance with a feature of the invention, and to provide for electronic compensation of tracking jumps of the scanning optic, due to shocks or vibration, for example, a repositioning system 36 and a synchronization system 37 are additionally provided.

The invention, thus, basically requires the memory 31, the repositioning system or means 36 and a synchronization system or means 37 to synchronize writing into the memory after repositioning.

The repositioning system or arrangement 36 is connected via a control bus 38 with the focussing servo 16, the tracking servo 21, and the slider servo 15, and is used to reset the scanning optic after occurrence of a tracking jump.

The synchronization system 37 is connected via control bus 39 with the control and address input of the memory 31. The synchronization system 37 synchronizes the beginning of writing into the memory after repositioning of the scanning optic 13 by the repositioning system 36 upon termination of a prior recording of data in the memory immediately in advance of the tracking jump. The repositioning system 36 and the synchronizing system 37, preferably, together are in form of a microprocessor.

Figure 2:
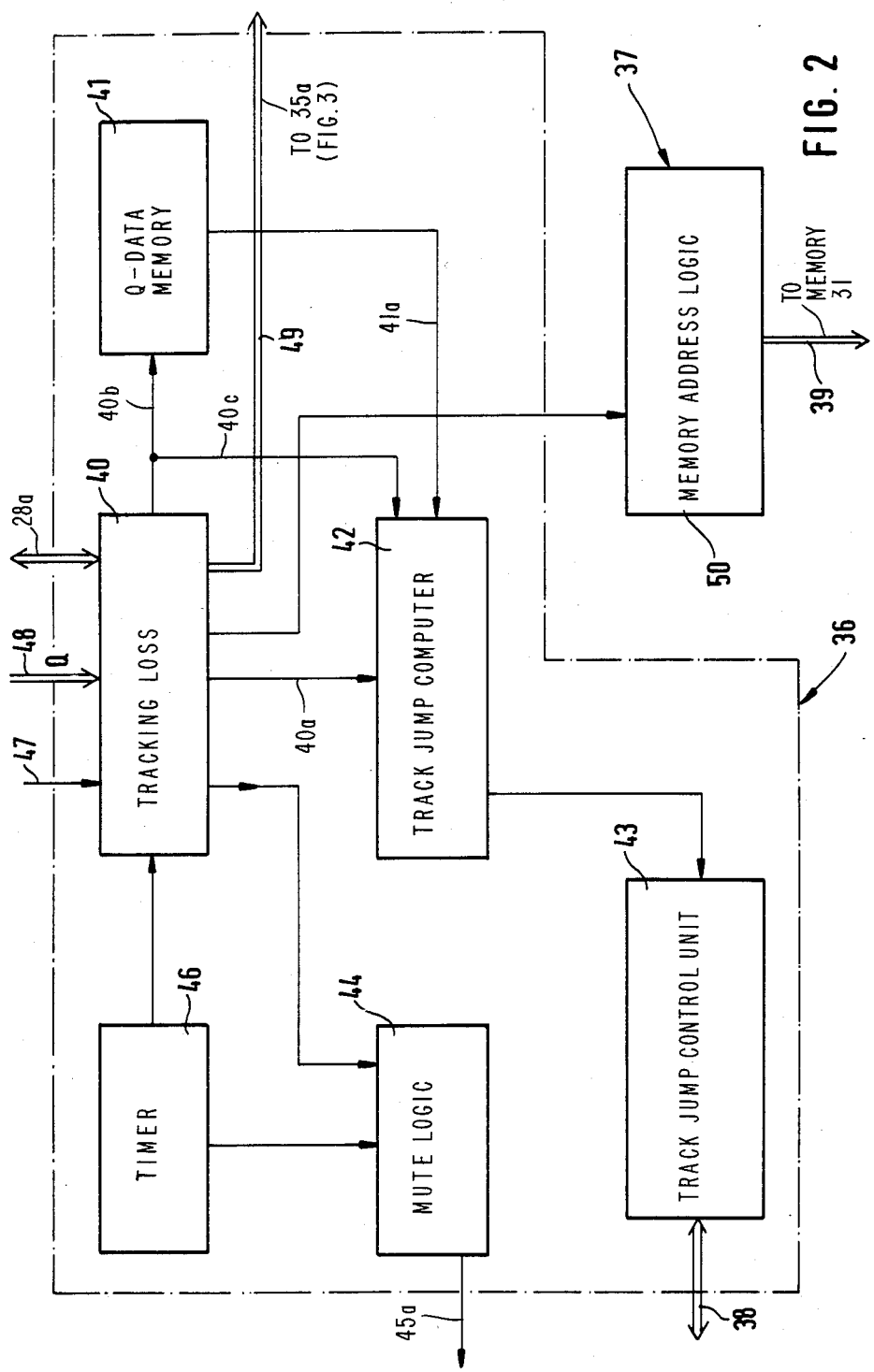
FIG. 2 is a fragmentary diagram of a portion of the system of a CD player, illustrating especially the repositioning and synchronizing arrangement of FIG. 1.

The repositioning system 36 is shown in detail in FIG. 2, to which reference will now be made.

REPOSITIONING SYSTEM 36, WITH REFERENCE TO FIG. 2

The system 36 includes a group of functional components which, together, provide for repositioning of the scanning head 13. A tracking loss detector 40 is connected to a Q-data memory 41. A track jump control unit 43 receives input from the track jump computer 42 and provides an output via bus 38 (see FIG. 1) to the servo units 15, 16 and 21. A mute logic 44 is connected to the tracking loss detector 40, and provides a blocking signal for the stereo channels L, R of the audio portion of the CD player, by controlling a muting circuit 45 (FIG. 1). A timer 46 is coupled to the tracking loss detector 40 and to the mute logic 44.

The tracking loss detector 40 receives the mirror signal generated by the mirror detector 22 via a signal line 47. The tracking loss detector 40, further, receives the Q-data over Q-data line 48 from the subcode demodulator 27. The tracking loss detector 40 is further coupled via line 49 with the control terminal 35 of the controlled frequency divider 35 (FIG. 3) of the clock generator 42. Line or bus 28a connects the tracking loss detector 40 with the system control CPU 28.

OPERATION

The tracking loss detector 40 evaluates the mirror signal and the Q-data and detects loss of tracking of the scanning device 13, and, conversely, retracking of a track by the scanning device 13. In both cases, the tracking loss detector 40 provides a corresponding output signal.

The Q-data supplied to the tracking loss detector 40 are continuously stored in the Q-data memory 41 and applied to the track jump computer 42. The Q-data stored in the memory 41 include at the same time all the nine Q-data which are part of a data block.

The track jump computer 42 computes the tracks jumped by the scanning optic 13 by comparison of the Q-data immediaely in advance of loss of tracking with the Q-data immediately after finding the track again. Since the Q-data contain information regarding the length of playing, the difference in representative of a time difference and, at uniform linear scanning rate, thus a measure for the number of tracks which have been jumped.

The track jump control unit 43 generates a reset signal, the level or value of which is representative of the number of tracks which have been jumped, and as computed in the track jump computer 42. The reset signal is applied via the control bus 38 to the tracking servo 21 (FIG. 1) which, in turn, so controls the two-axis element of the scanning optic 13 that it is moved in radial direction to return the laser beam to the original position in advance of the track jump, that is, radially with respect to the rotating CD 10.

The synchronizing system 37, essentially, includes a memory address logic 50 (FIG. 2), the input of which is coupled to the output of the tracking loss detector 40. When a tracking loss signal is present, derived from the tracking loss detector 40, writing of digital data in the memory 31 (FIG. 1) is blocked. Blocking is released as soon as the first data word occurs of that data block which follows the entirely stored data block and last stored in the memory 31. The memory address logic 50 additionally can store the address associated with that last prior complete data block and to so address the memory 31 that, upon reading, an address jump to the next stored address occurs as soon as the last preceding data word, that is, the last data word of the entirely stored data block before tracking loss, appears at the data output of the memory 31. The signal provided by the tracking loss detector 40 upon finding again the track, after loss thereof, is provided as a switch-over signal to the controlled second frequency divider 35 (FIG. 3) of the clock 32. The division ratio of the second frequency divider 35 is so changed that the frequency $f_{var}$ at the output thereof is increased. This increases the clock rate for processing of signals within the signal processing unit 18, and thus the scanning frequency of the CD plate 10 and the plate speed. The writing process of the digital audio signals available at the output of the signal processing unit for the memory 31 is thus increased, so that memory 31 will receive data to be written therein at a higher rate. This increased writing frequency causes the memory 31 to be rapidly filled with new data so that, in case of a new tracking loss, a sufficiently high quantity of data is available within memory 31. This sufficiently large quantity of data can be made audible during the tracking loss and subsequent repositioning of the scanning optic 13 on the previously lost position, by continuous read-out of the memory 31 at its normal or constant reproducing or reading-out rate, as determined by the frequency divider 34 (FIG. 3).

OPERATION OF THE CIRCUIT FOR COMPENSATION OF A TRACKING JUMP

The elements primarily used are the memory 31, the repositioning system 36 and the synchronizing system 37.

Upon beginning of playing a CD 10, memory 31 is first filled with digital data derived from the signal processing unit 18. The memory address logic 50 (FIG. 2) releases the output of the memory 31 only after the memory 31 is full. The stored data can then be read-out or reproduced continuously with the constant reading frequency $f_{const}$, derived from the first frequency divider 34 (FIG. 2), for transmission to the digital filter 25. At the same time, a writing or recording of new digital data can occur, with a writing frequency $f_{var}$, so that new digital data obtained from the output of the signal processing unit 18 can be written in the memory 31.

Let it be assumed that a mechanical shock or other jarring causes the scanning optic 13 to jump over a track or over several tracks, the repositioning system 36 and synchronization system 37 will carry out the following four steps to compensate for the track jump:
(1) recognition of loss of tracking;
(2) resetting on the old track;
(3) change of address in memory 31; and
(4) refilling the memory 31.

The tracking loss detector 40 supervises the Q-data line 48 and the signalling line 47 to the mirror detector 22 (FIG. 1). The Q-data which are applied to the tracking loss detector, namely the data TNO, X, MIN, SEC, FRAME and/or AMIN, ASEC and AFRAME are continuously stored in the Q-data memory 41.

Tracking loss is sensed by monitoring the RF level at the output of the scanning optic 13. Upon loss of tracking, the RF level at the output of the scanning optic 13 collapses. The mirror signal then will drop below a predetermined or preset level or threshold. Further, the Q-data are no longer available. Thus, the tracking loss detector 40 can readily recognize a tracking loss and provides a tracking loss signal, for example in form of a suitable pulse or pulse sequence or data, to the mute logic 44 which, in turn, provides a blocking signal to the muting circuit 45 (FIG. 1). This blocks the muting circuit so that the muting which would, otherwise, occur, in the CD player, is inhibited, and muting of the audio signal is prevented. At the same time, the tracking loss signal activates the track jump computer 42 via connecting line 40a.

The tracking servo 21 positions the optical scanner 13 after tracking oss on any randomly available track. The new data $TN_1$, $MIN_1$, $SEC_1$, $FRAM_1$ and/or $AMIN_1$, $ASEC_1$, $AFRAME_1$ will then be applied to the tracking loss detector 40 as new Q-data. They are, in turn, recorded in the Q-data memory 41, via line 40b and additionally applied via line 40c to the track jump computer 42. Upon recording of the Q-data in memory 41, the last-stored data written into the Q-memory 41 immediately preceding tracking loss are read-out and applied via line 41a to the track jump computer 42. The difference of the Q-data prior to loss of tracking and after finding a new track permits the track jump computer to calculate the number of the tracks which have been jumped by the scanning optic—considering the aforementioned timing, and hence distance relationships. The track jump control unit 43, based on the number of computed tracks which have been jumped, then will generate a reset signal via bus 38 to the tracking servo 21 (FIG. 1) of such magnitude and direction that the scanning optic 13 is repositioned on a data block which precedes the data block which was last completely stored in the memory 31 prior to loss of tracking.

During the entire tracking loss and repositioning process, data are continuously read-out from memory 31 with constant reading frequency. The memory 31 must have such a memory capacity that continuous read-out of data from a loss of tracking up to new scanning of the last entirely stored data block BV in advance of tracking loss is insured. During this time, no data are recorded in the memory 31.

The data writing process is continued as soon as the first data word of the data block $B_{V+1}$ is available at the input of the memory 31. The data block $B_{V+1}$ is that data block which immediately follows the data block $B_V$ and last recorded in its entirety in the memory 31 before loss of tracking. The memory address logic 50 (FIG. 2) stores the address $A_{V+1}$ which is associated with the data block $B_{V+1}$.

As soon as the last data word of the entirely stored data block $B_V$, that is, the data block recorded before loss of tracking, has been read-out from memory 31, the memory address logic 50 generates an address jump to the address $A_{V+1}$ whichis the first data word of the data block $B_{V+1}$. Thus, read-out of the memory 31 is continued with the first and all subsequent data words of the data block $B_{V+1}$, and read-out of data will be continuous, thereby insuring continuous supply of data to the digital filter 25, and continued reproduction of the audio signal.

After the first data word of the data block $B_{V+1}$ has been emitted, the memory 31 is no longer sufficiently filled in order to compensate for further tracking losses. At the latest upon refinding a track, that is, immediately in advance of the repositioning step, the tracking loss detector provides a control signal over line 49 to the clock generator 32 (FIG. 3), and specifically to terminal 35a of the second and controlled frequency divider 35, to provide for switch-over of the division ratio thereof. The frequency divider 35 will so change the frequency division that the variable clock frequency $f_{var}$ applied to the signal processing unit 18 (FIG. 1) is increased. This increase in frequency increases the speed of the CD, causing an increase in scanning speed of the CD 10, and a higher writing speed for the memory 31, so that the memory 31 is rapidly refilled again. When a sufficiently large quantity of data are stored in the memory 31, the transfer signal at the input 35a of the second frequency divider disappears, and the output of the frequency divider 35 reverts to the standard and old frequency value.

The memory 31 can be placed at any suitable position within the signal processing path of the signal processing unit 18, that is, between the input A/D conversion and the final output D/A converter 26. It is shown separately in the drawings for ease of explanation, although the function thereof is readily combinable with other components, for example with the RAM 23, merely by increasing the memory capacity of the RAM 23 over that otherwise required for mere operation of the signal processing unit 18. The arrangement in which the memory 31 is placed immediately in advance of the digital filter 25, however, insures that the memory 31 need have only the minimum storage capacity, and thus is preferred.

Applying the Q-data to the tracking loss detector 40 (FIG. 2) and storing the Q-data, successively as they are applied to the tracking loss detector, in the Q-data memory 41, which, in turn, is coupled to the track jump computer 42 via connection 41a, permits ready calculation of the number of tracks which have been skipped as well as the fact that a scanned track is being lost, by determining the difference between the Q-data which are being stored and which have just been stored. By use of Q-data of the subcode which is decoded anyway, a very simple arrangement is provided for reliably calculating the number of tracks being jumped, in other words, the magnitude of the track jump. The track jump control 43 then can readily generate the appropriate reset signal for the scanning optic 13 (FIG. 1) for resetting the scanning optic on the prior track. Formation of the difference of the Q-data upon loss of tracking and the prior tracking, which is formed by a time difference, permits ready calculation of the track jump and defines the number of tracks which have been skipped. A simple and easy calculation, thus, is all that is necessary. This, therefore, is a particularly suitable arrangement.

Applying to the tracking loss detector 40 the mirror detector signal permits generation of a signal which has information content regarding the presence of the scanning optic on the information track or between tracks, that is, on the metal mirror. Upon tracking loss, the level of the mirror signal collapses since the scanning beams scans a minimum of high-frequency voltages. A tracking loss thus can be easily recognized. Rather than using the mirror signal, a high-frequency level available at the output of the scanning optic, forming an analog signal, can be used to detect tracking loss. Upon tracking loss, the level of the high-frequency signal likewise collapses in similar manner until the scanning optic is again repositioned on a new information track. To increase the reliability of tracking loss detection, the decoded Q-data are likewise applied to the tracking loss detector 40. Upon loss of tracking of an information track, the Q-data are no longer available. This loss can be evaluated to form a detection characteristic, separately or in addition to checking the high-frequency signal.

The mute logic 44, connected to the tracking loss detector, is so arranged that, upon tracking loss detection, the mute logic applies a blocking signal to the muting circuit 45 since, otherwise, the muting circuit which is present in the standard CD player and which mutes the output upon sensing of the mirror surface, rather than of a scanned track, would mute the audio output.

Using different clock rates for normal or standard signal processing by the signal processing unit 18, so that the memory 31 is rapidly filled with newly processed digital data, to be sufficiently filled with data for possibly compensating for a subsequent tracking jump, and to insure continuity of read-out or reproduction from the memory 31 at the standard read-out frequency $f_{const}$. Simultaneously, the speed of the drive motor driving the CD 10 is also increased. Resetting of the recording frequency to standard frequency can readily be carried out by sensing whether the memory 31 is sufficiently filled, to then inhibit change of the clock rate via bus 49 of the clock generator 32, for example by a return signal to the tracking loss detector to remove the "frequency increase" signal from bus 39, by a suitable connection, not specifically shown since it can be in accordance with any standard and well known hardware or software arrangement.

The read-out frequency $f_{const}$ of the write-read memory 31, thus, is constant and independent of the writing frequency $f_{var}$. The writing frequency $f_{var}$ is changeable, preferably in at least two frequency steps, although more than two frequency steps may be used; the writing frequency, after a tracking loss, is increased to a higher write-in frequency rate for writing into the write-read memory 31 until the aforementioned increased quantity of data is stored therein.

In accordance with a preferred feature of the invention, the signal processing unit 18 as well as the servo loops for the CD drive motor 11 are controlled by a single clock generator. This clock generator preferably includes a quartz oscillator 33 (FIG. 3) with two frequency dividers connected thereto; the first frequency divider provides a fixed division ratio, for standard read-out of the write-read memory; the second frequency divider 35 is variable, to provide the appropriate operating frequency both for the signal processing unit 18 as well as for the components connected to or controlled thereby, including the motor 11 for the CD 10. Tthe division ratio of the second frequency divider 35 can be reduced for a predetermined time interval controlled, for example, by timer 46 (FIG. 2) and coupled to the tracking loss detector 40. The repositioning system 36 as well as the synchronizing system 37 can be combined in a single microprocessor; some of the functional features thereof, shown as specific blocks in FIG. 2, can be realized by software, for example recognition of loss of input of Q-data through input bus 48, level of mirror signal and the like.

Various changes and modifications may be made within the scope of the inventive concept.

A suitable microprocessor to form the combined repositioning system 36 and the synchronizing system 37 is: TMS 7000 (Texas Instruments).

I claim:

1. Compact disc player, particularly for placement in unstable locations, especially in a motor vehicle, and for reproduction of data stored on a compact disc (CD) (10) located on the player, in which the data are stored on the CD along spiral tracks, said player having a disc drive motor (11) for rotating the disc;

an optical scanning system (13) mechanically relatively at least radially movable with respect to the disc and producing scanning output signals;

signal processing means (17, 18, 25) coupled to receive the scanning output signals, said signal processing means storing groups of scanning output signals in data blocks and processing said blocks of signals and providing digital audio output signals;

means (26, LPF, L, R) for receiving said digital output signals and converting said digital output signals into analog audio output signals;

a tracking detector (20) for detecting tracking of the optical scanning system (13) on the tracks of the disc (10);

a tracking servo system (14, 15, 21) coupled to the tracking detector for maintaining the scanning optical system (13) on said tracks, and comprising, in accordance with the invention, a write-read memory (31) included in the signal processing means in the path of the signal from said system to form the digital audio output signal, said write-read memory providing intermediate storage of the data blocks, and being arranged for continuous read-out of the data in the blocks and application thereof to said means for converting the digital output signals to analog output signals;

a repositioning system (36) coupled to the optical scanning system (13) for resetting the optical scanning system after a tracking jump;

and synchronizing means (37) coupled to the write-read memory (31) for synchronizing the initiation of writing into the write-read memory after repositioning of the optical scanning system (13) with the end of writing or recording in said memory of a data block in advance of a track jump.

2. The player of claim 1, wherein the write-read memory (31) comprises a random access memory (RAM).

3. The player of claim 1, wherein the write-read memory (31) comprises a first-in, first-out (FIFO) memory.

4. The player of claim 1, wherein said optical scanning system (13) provides high-frequency analog scanning output signals;

and said signal processing means includes a signal processing unit (18) converting said high-frequency analog signals into digital signals for digital processing thereof.

5. The player of claim 1, wherein said signal processing means includes a digital filter (25) providing said digital output signals, said digital filter being connected to a digital/analog converter (26) and forming part of said means for converting said digital output signals into analog audio output signals;

and wherein said write-read memory (31) is connected immediately in advance of the input of said digital filter (25).

6. The player of claim 1, wherein the means for converting said digital output signals comprise a digital/analog converter (26);

and wherein said write-read memory (31) is connected immediately in advance of the input to said digital/analog converter.

7. The player of claim 1, wherein the repositioning system (36) comprises a tracking loss detector (40) for detecting loss and redetection of tracking of the optical scanning system (13) of a track on the CD (10);

a track jump detector (42) coupled to the tracking loss detector (40), said track jump detector calculating the number of tracks jumped between loss of tracking and repositioning of the optical scanning system (13) on a track to thereby determine the number of tracks jumped upon a track jump;

a track jump control unit (43) generating a reset signal for resetting the optical scanning system (13) on the track from which a track jump occurred, said track jump control unit (43) being coupled to the tracking servo system (14, 15, 21) for control of said optical system.

8. The player of claim 7, wherein the scanning output signals include data blocks which include Q-data representative of timing of occurrence of specific data recorded on the CD with respect to a predetermined datum;

wherein the tracking loss detector (40) receives said Q-data;

a Q-data memory (41) is provided, coupled to the tracking loss detector, and storing, successively, the data applied to the tracking loss detector (40), and being connected to said track jump computer (42);

and wherein the track jump computer calculates the number of the jumped tracks based on the difference of the Q-data, upon loss of tracking and positioning of the optical system on another track upon occurrence of a track jump.

9. The player of claim 7, wherein the tracking detector (20) includes a mirror detector (22) detecting if a scanning beam from the optical scanning system is placed over an information track on said CD or on an adjacent mirror surface of the CD between information tracks, said tracking detector being responsive to the level of the high-frequency output signals derived from the optical scanning system and generating a mirror signal upon change in level of said high-frequency output signal, representative of loss of tracking of an information track and impingement of a beam from the optical system on the mirror surface of the CD;

and wherein the tracking loss detector is coupled to the mirror signal detector and provides an output signal for the tracking jump computer when the level of the mirror signal passes a predetermined threshold.

10. The player of claim 9, wherein the tracking detector (20) includes a mirror detector (22) detecting if a scanning beam from the optical scanning system is placed over an information track on said CD or on an adjacent mirror surface of the CD between information tracks, said tracking detector being responsive to the level of the high-frequency output signals derived from the optical scanning system and generating a mirror signal upon change in level of said high-frequency output signal, representative of loss of tracking of an information track and impingement of a beam from the optical system on the mirror surface of the CD;

wherein the tracking loss detector is coupled to the mirror signal detector and provides an output signal for the tracking jump computer when the level of the mirror signal passes a predetermined threshold;

and when said Q-data are missing from the input to said tracking loss detector.

11. The player of claim 7, wherein the optical scanning signals include data blocks which include Q-data representative of timing of occurrence of specific data recorded on the CD (10) with respect to a predetermined datum;

and wherein the tracking loss detector (40) is coupled to receive the Q-data, and determines if the Q-data are present or not, and, upon detection of loss of Q-data, generating a tracking loss signal.

12. The player of claim 7, further including a muting circuit (45) coupled to mute the analog audio output signal, and wherein the tracking loss detector (40) provides an output signal controlling said muting circuit (45) for blocking the muting circuit to permit continued audio output from said write-read memory even upon loss of tracking.

13. The player of claim 7, wherein the track jump control unit (43) generates a reset signal which resets the optical scanning system on a data block ($B_{V+1}$) which is immediately in advance of a preceding data block ($B_V$) which has been entirely written into the write-read memory (31).

14. The player of claim 13, wherein the synchronizing means (37) includes a memory address logic (50), said memory address logic being coupled to the tracking loss detector, and generating a blocking signal blocking writing of data into the write-read memory (31) upon detection of a tracking loss, and then controls the addresses of the first subsequent data block ($B_{V+1}$) which immediately follows the preceding data block ($B_V$) which had previously been entirely stored in said write-read memory (31), said address ($A_{V+1}$) associated with said subsequent data block ($B_{V+1}$) being addressable by an address jump as soon as the last data word of the previously entirely stored data block ($B_V$) appears at the data output terminal of the write-read memory (31).

15. The player of claim 1, further including means (49, 35a, 35) for increasing the speed of a motor (11) driving the CD (10) after repositioning of the optical scanning system (13) for increasing the writing rate into the write-read memory (31).

16. The player of claim 15, wherein said means for increasing the writing rate comprises a frequency generator (32) supplying a first fixed frequency ($F_{const}$) connected to the write-read memory (31) for constant read-out of the memory content thereof, and a second and variable frequency ($f_{var}$), independent of the read-out frequency ($f_{const}$), said independent variable frequency being changeable in at least two frequency ranges;

and wehrein the writing the writing frequency, at least after detection of a tracking loss of the write-read memory is increased over writing frequency upon normal scanning by the optical scanning system to accelerate writing of data in the write-read memory after detection of a tracking loss.

17. The player of claim 16, wherein the frequency generating means comprises a quartz oscillator (33) and a first fixed frequency divider (34) providing the fixed read-out frequency for said write-read memory, and a second controllable frequency divider (35) having a variable controllable frequency division ratio, for providing a second variable clock frequency ($f_{var}$), said second variable clock frequency being connected to and controlling the operating rate of at least part (18) of said signal processing means (17, 18, 25);

said repositioning means (36) including a tracking loss detector detecting loss of tracking of a data track, and providing an output signal controlling said second frequency divider to increase the frequency output thereof and apply said increased frequency to the write-read memory for accelerated writing of data therein;

and a timing circuit (46) is provided for controlling the time duration of the accelerated writing frequency.

18. The player of claim 1, wherein the repositioning means (36) and the synchronizing means (37) comprise a single microprocessor.

19. Method of repositioning an optical scanning system (13) of a compact disc player, upon subjecting the disc player to shock, vibration or the like, particularly for a compact disc player placed in an unstable position, such as in a motor vehicle, said compact disc player storing data on a compact disc (10) located thereon, in which the data are stored on the compact disc (CD) along spiral tracks, said player having a disc drive motor (11) for rotating the disc;

an optical scanning system (13) mechanically relatively at least radially movable with respect to the disc and producing scanning output signals;

signal processing means (17, 18, 25) coupled to receive the scanning output signals, said signal processing means storing groups of scanning output signals in data blocks and processing said blocks of signals and providing digital audio output signals;

means (26, LPF, L, R) for receiving said digital output signals and converting said digital output signals into analog audio output signals;

a tracking detector (20) for detecting tracking of the optical scanning system (13) on the tracks of the disc (10);

a tracking servo system (14, 15, 21) coupled to the tracking detector for maintaining the scanning optical system (13) on said tracks, and comprising, in accordance with the invention, the steps of buffer-storing the digital data blocks in a write-read memory (31);

continuously reading-out said stored data at a predetermined read-out rate ($f_{const}$) for deriving therefrom the analog audio output signals;

repositioning the optical scanning means after detecting a tracking jump;

and synchronizing the initiation of further writing in the buffer write-read memory after repositioning of the optical scanning means with termination of data recorded in the write-read memory prior to detection of a track jump.

20. The method of claim 19, wherein said repositioning step comprises sensing loss of tracking of the optical system upon scanning of said tracks;

calculating, based on data derived from tracks being scanned after a tracking loss, the number of tracks which have been jumped by said optical scanning system due to the shock;

and repositioning the optical scanning system on the track previously scanned under control of said so-computed jumped tracks.

21. The method of claim 20, wherein the step of computing the number of jumped tracks comprises analyzing the scanned data for timing information related to data representative of the timing of occurrence of specific data recorded on the CD with respect to a predetermined datum;

and determining, based on said timing, the length of tracks, and hence the number of adjacent spiral tracks having been jumped due to said shock.

22. The method of claim 19, including the step of accelerating writing of data into said write-read memory subsequent to detection of a tracking jump and upon repositioning of said optical scanning system to rapidly refill said write-read memory, including the step of accelerating the rate of rotation of a motor driving said CD.

* * * * *